(12) United States Patent
Kim et al.

(10) Patent No.: US 7,664,074 B2
(45) Date of Patent: Feb. 16, 2010

(54) SYSTEM FOR PACKET DATA SERVICE IN THE MIXED NETWORK OF ASYNCHRONOUS COMMUNICATION NETWORK AND SYNCHRONOUS COMMUNICATION NETWORK AND HAND-OVER METHOD THEREOF

(75) Inventors: Hyun-Wook Kim, Seongnam-si (KR); Young-Lak Kim, Yongin-si (KR); Nam-Gun Kim, Seoul (KR); Jong-Tae Ihm, Seongnam-si (KR)

(73) Assignee: SK Telecom Co., Ltd., Seoul (KR)

( * ) Notice: Subject to any disclaimer, the term of this patent is extended or adjusted under 35 U.S.C. 154(b) by 566 days.

(21) Appl. No.: 10/585,405

(22) PCT Filed: Jan. 7, 2005

(86) PCT No.: PCT/KR2005/000051

§ 371 (c)(1),
(2), (4) Date: Jan. 19, 2007

(87) PCT Pub. No.: WO2005/067179

PCT Pub. Date: Jul. 21, 2005

(65) Prior Publication Data

US 2009/0190549 A1    Jul. 30, 2009

(30) Foreign Application Priority Data

Jan. 8, 2004    (KR) ...................... 10-2004-0001282
Jan. 8, 2004    (KR) ...................... 10-2004-0001285

(51) Int. Cl.
    H04W 4/00    (2006.01)
(52) U.S. Cl. ...................... 370/331; 370/328; 370/310; 370/350; 455/436

(58) Field of Classification Search ................. 370/310, 370/331–332, 328, 350; 455/432.1–432.2, 455/436–444, 550.1, 552.1
See application file for complete search history.

(56) References Cited

U.S. PATENT DOCUMENTS 6,389,008 B1 *   5/2002   Lupien et al. ............... 370/352

(Continued)

FOREIGN PATENT DOCUMENTS

EP      1104974        6/2001

(Continued)

OTHER PUBLICATIONS

International Search Report dated Apr. 29, 2005 for PCT/KR2005/000051.

*Primary Examiner*—Kamran Afshar
(74) *Attorney, Agent, or Firm*—Lowe Hauptman Ham & Berner, LLP

(57) ABSTRACT

Disclosed herein is a mobile communication terminal and handover method therefor. In the mobile communication system, a Gateway GPRS Support Node (GGSN) of the asynchronous network is connected to a Packet Data Service Node (PDSN) of the synchronous network. Accordingly, as a mobile communication terminal, using packet data service in the asynchronous mobile communication system, moves into an area of a synchronous mobile communication system, the synchronous mobile communication system sets control signals and traffic to transmit packet data in response to a request from the asynchronous mobile communication system. Further, if forward and reverse channels are assigned between the mobile communication terminal and the synchronous mobile communication system, call setup is performed to provide the packet data service, and then a node B of the asynchronous mobile communication system releases the connection to the mobile communication terminal.

15 Claims, 10 Drawing Sheets

U.S. PATENT DOCUMENTS

| | | | |
|---|---|---|---|
| 6,704,581 B1* | 3/2004 | Park et al. | 455/553.1 |
| 6,975,608 B1* | 12/2005 | Park et al. | 370/332 |
| 7,421,203 B2* | 9/2008 | Kim et al. | 398/59 |
| 2002/0068565 A1 | 6/2002 | Purnadi et al. | |
| 2004/0106408 A1* | 6/2004 | Beasley et al. | 455/436 |
| 2007/0258405 A1* | 11/2007 | Kim et al. | 370/331 |
| 2007/0259667 A1* | 11/2007 | Kim et al. | 455/440 |
| 2008/0037470 A1* | 2/2008 | Kim et al. | 370/331 |
| 2008/0056190 A1* | 3/2008 | Kim | 370/331 |
| 2008/0095111 A1* | 4/2008 | Kim et al. | 370/331 |
| 2008/0117874 A1* | 5/2008 | Park et al. | 370/331 |
| 2008/0137607 A1* | 6/2008 | Ju et al. | 370/331 |
| 2008/0146228 A1* | 6/2008 | Kim et al. | 455/436 |
| 2008/0219212 A1* | 9/2008 | Kim | 370/331 |
| 2008/0242304 A1* | 10/2008 | Ju et al. | 455/439 |
| 2008/0254796 A1* | 10/2008 | Kim et al. | 455/436 |
| 2008/0287131 A1* | 11/2008 | Ju et al. | 455/439 |
| 2009/0129359 A1* | 5/2009 | Lee et al. | 370/342 |

FOREIGN PATENT DOCUMENTS

| | | |
|---|---|---|
| WO | WO 00/51393 | 8/2000 |
| WO | WO 03/052970 | 6/2003 |

* cited by examiner

SYSTEM FOR PACKET DATA SERVICE IN THE MIXED NETWORK OF ASYNCHRONOUS COMMUNICATION NETWORK AND SYNCHRONOUS COMMUNICATION NETWORK AND HAND-OVER METHOD THEREOF

CROSS REFERENCE TO RELATED APPLICATION

This application is the National Phase application of International Application No. PCT/KR2005/000051, filed Jan. 7, 2005, which designates the United States and was published in English. This application, in its entirety, is incorporated herein by reference.

TECHNICAL FIELD

The present invention relates, in general, to a handover method for packet data service in a mobile communication network in which asynchronous and synchronous networks coexist and, more particularly, to a mobile communication system and handover method thereof, which enable handover of a mobile communication terminal that is using a packet data service or is in a dormant state when a gateway general packet radio service support node of an asynchronous network connects to a packet data service node of a synchronous network in a mobile communication network in which the asynchronous and synchronous networks coexist.

BACKGROUND ART

With the development of mobile communication technology, a mobile communication network changes every generation. Currently, a network adopts a structure in which a synchronous mobile communication system (Code Division-Multiple Access [CDMA] mobile communication system), designated as second generation or 2.5-th generation network, and an asynchronous mobile communication system (Wideband CDMA [WCDMA] mobile communication system), designated as a third generation network, coexist.

Further, in order to support global roaming between mobile communication systems, a Dual-Band Dual-Mode (DBDM) mobile communication terminal capable of being used in both a synchronous mode system and an asynchronous mode system has been developed. By using the mobile communication terminal, different types of services can be used in asynchronous and synchronous mode system areas.

Currently, an asynchronous mobile communication system is being constructed in areas having a great number of service requests, so that a synchronous mode mobile communication system has been developed into a form in which the service area thereof includes service areas of an asynchronous mode system. However, since the asynchronous mobile communication system is still in an initial stage and requires enormous investment to be implemented, the service cannot be provided to a wide area, so that the service area of an asynchronous mobile communication system overlaps with that of a synchronous mobile communication system.

Accordingly, since the service area of the asynchronous mobile communication system is limited, there is a problem in that service is interrupted when a subscriber to the asynchronous mobile communication system moves into a synchronous area, in which an asynchronous mobile communication service cannot be provided, during the use of the packet data service in an asynchronous area.

Further, there is a problem in that service is interrupted when a subscriber to the asynchronous mobile communication system, whose terminal is in a dormant state in an asynchronous area, moves into a synchronous area in which an asynchronous mobile communication service is not provided.

In this case, "dormant state" means a state in which a mobile communication terminal using a packet data service is in a disconnected state when the transmission/reception of data does not occur between the mobile communication terminal and a mobile communication system, and can immediately make a transition to an active state when a data communication signal is generated. If a dormant state is not maintained at the time of handover from the asynchronous mobile communication system to the synchronous mobile communication system, that is, if a packet data service is completely released, there is a disadvantage in that the mobile communication terminal must again perform a procedure of connecting to the synchronous mobile communication system from the beginning in order to use the packet data service, thus causing the deterioration of service quality, such as the increase of a connection time.

As described above, if asynchronous and synchronous mobile communication systems coexist and the service area of the asynchronous mobile communication system is smaller than that of the synchronous mobile communication system, handover is required to provide continuous packet data service between the asynchronous and synchronous mobile communication systems.

DISCLOSURE OF THE INVENTION

Accordingly, the present invention has been made keeping in mind the above problems occurring in the prior art, and an object of the present invention is to provide a mobile communication system and handover method thereof, which provides continuous packet data service when a mobile communication terminal using a packet data service in an asynchronous network moves into a synchronous network, thus preventing service interruption.

Another object of the present invention is to provide a mobile communication system and handover method, which performs handover using mutual connection between a Gateway General packet radio service (GPRS) Support Node (GGSN) of an asynchronous network and a Packet Data Service Node (PDSN) of a synchronous network when a mobile communication terminal in a dormant state with respect to packet data service in the asynchronous network moves into the synchronous network, so that the mobile communication terminal remains in a dormant state even though the mobile communication terminal moves into the synchronous network, thus immediately starting the packet data service.

BEST MODE FOR CARRYING OUT THE INVENTION

Figure 1:
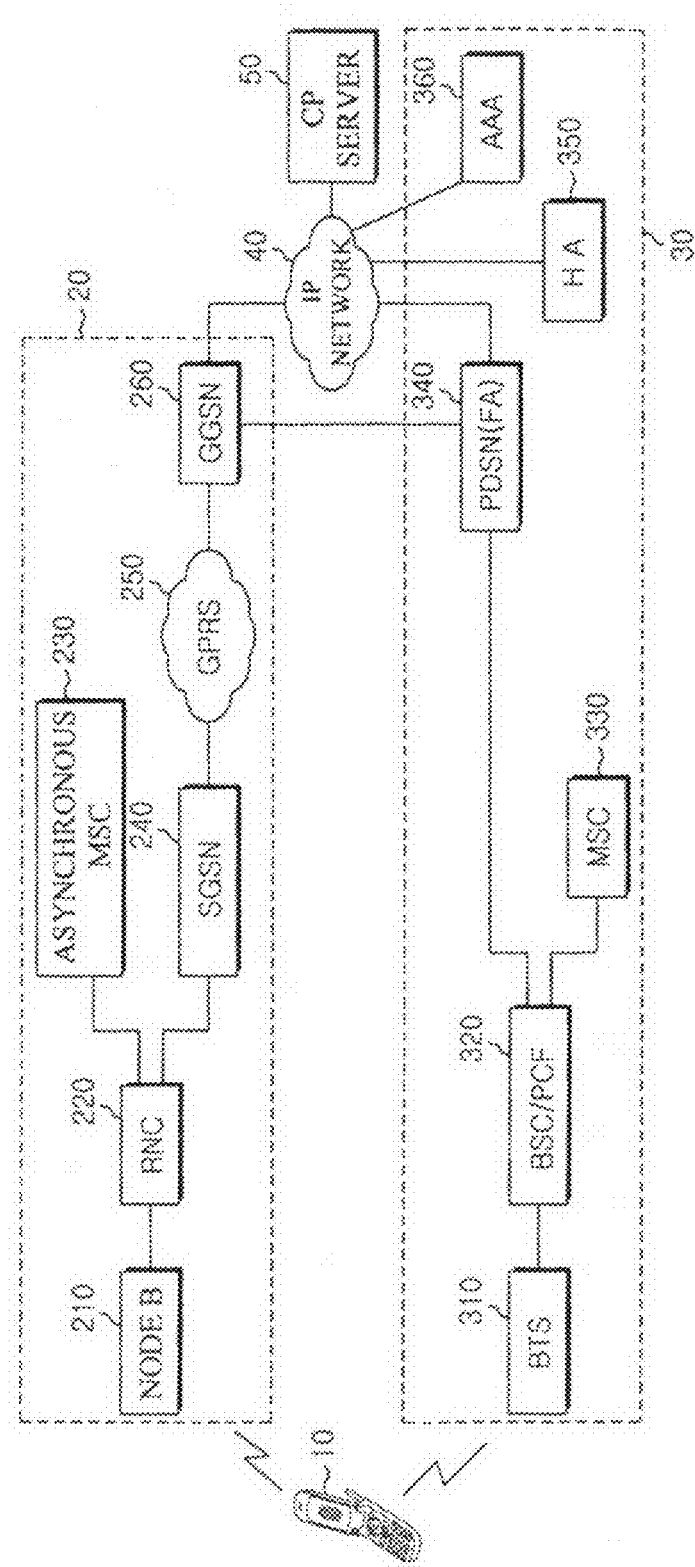
FIG. 1 is a view showing the configuration of a mobile communication network according to the present invention.

In order to accomplish the above objects, the present invention provides a handover method for providing a packet data service to a dual-band dual-mode mobile communication terminal in a mobile communication network in which asynchronous and synchronous mobile communication systems coexist, the dual-band dual-mode communication terminal being provided with an asynchronous modem unit and a synchronous modem unit, the asynchronous mobile communication system having a Gateway General packet radio service (GPRS) Support Node (GGSN) being connected to a packet data service node of the synchronous mobile communication system, the handover method comprising the first step of, as the mobile communication terminal that is connected to the asynchronous mobile communication system and uses the packet data service moves into an area of the synchronous mobile communication system, and a handover event occurs, a node B of the asynchronous mobile communication system notifying a Serving GPRS Support Node (SGSN)/GGSN of the asynchronous mobile communication system that handover is required; the second step of the SGSN/GGSN requesting a mobile switching center of the synchronous mobile communication system to perform handover, and the synchronous mobile switching center requesting a base station of the synchronous mobile communication system to perform handover, the third step of the synchronous mobile communication system performing a procedure of setting control signals and traffic for transmission of packet data; the fourth step of the base station notifying the mobile switching center that handover has been completed and assigning a forward channel to the mobile communication terminal; the fifth step of the mobile switching center notifying the SGSN/GGSN that handover has been completed; the sixth step of, as the SGSN/GGSN commands the node B to perform handover, the node B directing the mobile communication terminal to perform handover, the seventh step of performing assignment of a reverse channel between the mobile communication terminal and the synchronous mobile communication system, and the mobile communication terminal interfacing with the synchronous mobile communication system and notifying the base station that handover has been completed; the eighth step of the synchronous mobile communication system performing call setup for the packet data service; the ninth step of the base station notifying the synchronous mobile switching center that handover has been completed, and die mobile switching center notifying the SGSN/GGSN that handover has been completed; and the tenth step of the SGSN/GGSN requesting the node B to release a connection to the mobile communication terminal.

Further, die present invention provides a handover method for providing a packet data service to a dual-band dual-mode mobile communication terminal in a mobile communication network in which asynchronous and synchronous mobile communication systems coexist, the dual-band dual-mode communication terminal being provided with an asynchronous modem unit and a synchronous modem unit, the asynchronous mobile communication system having a Gateway General packet radio service (GPRS) Support Node (GGSN) being connected to a packet data service node of the synchronous mobile communication system, the handover method comprising the first step of, as the mobile communication terminal, in a dormant state with respect to the asynchronous mobile communication system, moves into an area of the synchronous mobile communication system, a Serving GPRS Support Node (SGSN)/GGSN of the asynchronous mobile communication system receiving information indicating that handover is required; the second step of the SGSN/GGSN commanding a base station of the synchronous mobile communication system to perform handover, the third step of the mobile communication terminal attempting to originate a call to the base station, and executing call processing and channel assignment between the base station and the mobile switching center of the synchronous mobile communication system; the fourth step of performing a negotiation related to call processing aid setup between the mobile communication terminal and the base station; the fifth step of the synchronous mobile communication terminal setting up a trunk; the sixth step of initialing a radio link protocol between the mobile communication terminal and the base station; and the seventh step of the base station notifying the mobile switching center that the channel assignment has been completed.

In addition, the present invention provides a mobile communication system in which asynchronous and synchronous mobile communication systems coexist the asynchronous mobile communication system including a node B functioning as a base station for wireless section communication with a dual-band dual-mode mobile communication terminal provided with an asynchronous modem unit and a synchronous modem unit, a radio network controller, a Serving General packet radio service (GPRS) Support Node (SGSN), and a Gateway GPRS Support Node (GGSN), die synchronous mobile communication system including a base station for supporting wireless section communication with the mobile communication terminal, a packet controller, and a packet data service node, the mobile communication system being capable of performing handover when the mobile communication terminal is using a packet data service, wherein the GGSN communicates with an IP network through an L1 layer for performing coding and modulation, an L2 layer for processing replies for message transmission, and a layer for tunneling the L2 layer, communicates with the SGSN through the L1 layer, the L2 layer, a User Datagram Protocol (UDP)/internet Protocol (IP) layer for exchanging messages, and a GPRS Tunneling Protocol (GTP)-U layer for defining a flow of packet data and information, communicates with the packet data service node through the L1 layer, the L2 layer, the UDP/IP layer, a Generic Routing Encapsulation (GRE) layer for encrypting and comprising packets and a High-level Data Link Control (HDLC) framing layer for performing link management, synchronization problem solution, flow control and error control, and provides the packet data service through a Point-to-Point Protocol (PPP) layer, a protocol stack of the SGSN includes an L1bis layer corresponding to the L1 layer of the GGSN, an Asynchronous Transfer Mode (ATM) layer for performing generation, extraction and exchange of packet data to correspond to the L2 layer, a UDP/IP layer and a GTP-U layer, a protocol stack of the node B/radio network controller includes an L1 layer corresponding to the L1bis layer of the SGSN, a Media Access Control (MAC) layer for assigning radio resources for multimedia data processing to correspond to the ATM layer, a Radio Link Control (RLC) layer for establishing a radio link with the mobile communication terminal and combining and dividing packet data to correspond to the UDP/IP layer, and a Packet Data Convergence Protocol (PDCP) layer for compressing a packet data header to correspond to the GTP-U layer, and the asynchronous modem unit of the mobile communication terminal performs data communication using a protocol stack that includes an HDLC framing layer for performing link management for link connection and disconnection, synchronization problem solution flow control and error control to correspond to the MAC/RLC/PDCP layers of the node B/radio network controller, and a PPP layer for receiving data through the PPP layer of the GGSN.

Hereinafter, embodiments of the present invention will be described in detail with reference to the attached drawings.

FIG. 1 is a view showing the configuration of a mobile communication network according to the present invention, in which the mobile communication network is depicted on the basis of components used to provide a packet data service.

A mobile communication terminal 10 applied to the present invention is a Dual-Band Dual-Mode (hereinafter referred to as DBDM) mobile communication terminal, which can be provided with both an asynchronous mobile communication service and a synchronous mobile communication service. The mobile communication terminal is selectively connected to an asynchronous mobile communication system 20 and a synchronous mobile communication system 30 in a wireless manner, thus using voice and data services. A detailed description thereof will be described later with reference to FIGS. 2 and 3.

The asynchronous mobile communication system 20 includes a node B 210 functioning as a base station to perform wireless section communication with the mobile communication terminal 10, a Radio Network Controller (RNC) 220 for controlling the node B 210, an asynchronous Mobile Switching Center (MSC) 230 connected to the RNC 220 to perform call switching so as to provide voice service to the mobile communication terminal 10, a Serving GPRS Support Node (SGSN) 240 disposed between the RNC 220 and a General Packet Radio Service (GPRS) network 250 to track the location of the mobile communication terminal 10 and perform access control and security functions, and a Gateway GPRS Support Node (GGSN) 260 connected to the SGSN 240 through the GPRS network 250 and connected to an IP network 40 to support interworking with external packets. Further, the synchronous mobile communication system 30 includes a Base Transceiver Station (BTS) 310 for supporting wireless section communication with the mobile communication terminal 10, a Base Station Controller (BSC) for controlling the BIS 310 and a packet controller (Packet Control Function: PCF) 320 for performing a function similar to that of the BSC at the time of providing a packet data service, such as the management of radio resources for die packet data service, a Mobile Switching Center (MSC) 330 connected to one or more base station controllers to perform call switching, a Packet Data Service Node (PDSN) 340 connected to the packet controller 320 to establish a Point-to-Point Protocol (PPP) session with the mobile communication terminal 10, interface with an external node, and perform a Foreign Agent (FA) function for the location registration of the mobile communication terminal 10 so as to provide a packet data service to a subscriber, a Data Core Network (DCN) (not shown) for supporting the interface between the packet data service node 340 and die IP network 40, a home agent 350 for authenticating the mobile communication terminal 10 and transmitting packet data to a foreign agent, and an Authentication Authorization Account (AAA) unit 360 for performing authentication, authorization and account functions for the mobile communication terminal.

Although not shown in die drawing, the MSCs 230 and 330 of the asynchronous mobile communication system 20 and the synchronous mobile communication system 30 are connected to each other through a No. 7 common channel signaling network to transmit and receive information required for handover of the mobile communication terminal 10, etc. therebetween Further, the GGSN 260 of the asynchronous mobile communication system 20 and the PDSN 340 of the synchronous mobile communication system 30 can transmit control signals and traffic through a Packet data-Packet data (P-P) interface. The P-P interface is an interface for communication between PDSNs in the synchronous mobile communication system, which is applied to communication with the GGSN 260 of die asynchronous mobile communication system, thus facilitating signal switching between asynchronous and synchronous networks.

In such a mobile communication system, die mobile communication terminal 10 of the present invention is selectively connected to the asynchronous mobile communication system 20 and the synchronous mobile communication system 30 and transmits and processes signal processing status with respect to the two systems.

Figure 2:
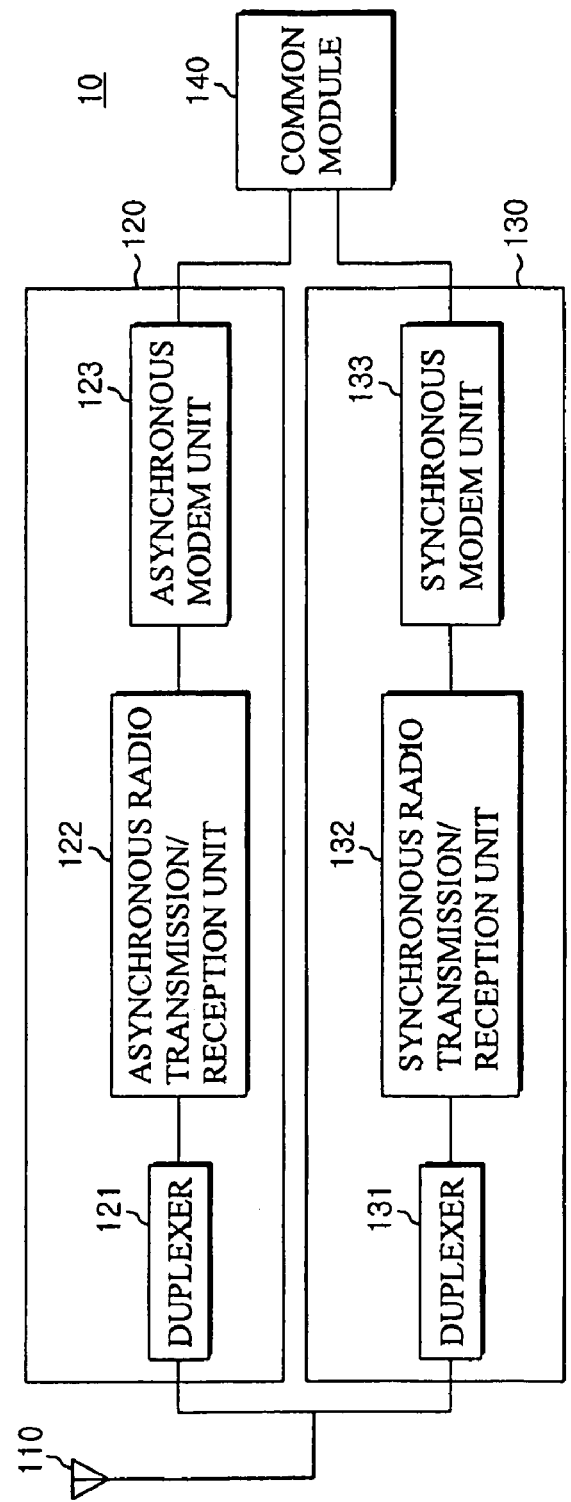
FIGS. 2 and 3 are views showing the construction of a mobile communication terminal applied to the present invention.

FIG. 2 is a view of an example of a mobile communication terminal applied to the present invention, which shows the case in which functional units for radio communication with asynchronous and synchronous networks are independently implemented.

As shown in FIG. 2, a DBDM mobile communication terminal 10 applied to the present invention includes an antenna 110, an asynchronous mobile communication service module 120, a synchronous mobile communication service module 130 and a common module 140.

The antenna 110 is capable of simultaneously processing frequency bands for synchronous and asynchronous mobile communication services.

The asynchronous module 120 includes a duplexer 121 functioning as a band pass filter for separately processing individual frequencies, an asynchronous radio transmission/reception unit 122 for separating transmission/reception radio waves into preset frequency bands, and an asynchronous modem unit 123 for processing wireless section protocol with an asynchronous mobile communication system. The synchronous module 130 includes a duplexer 131 functioning as a band pass filter for separately processing individual frequencies, a synchronous radio transmission/reception unit 132 for separating transmission/reception radio waves into preset frequency bands, and a synchronous modem unit 133 for processing wireless area protocol with a synchronous mobile communication system.

The common module 140 includes an application processor that functions as a central processing unit for controlling the asynchronous modem unit 123 and the synchronous modem unit 133 and performs a multimedia function, memory, an input/output unit, other application processing units, etc.

Further, in the DBDM mobile communication terminal 10, software used for user interface, additional services, mobility management, connection/session control, resource control, and protocol processing is installed, thus allowing a user to use various application services, performing handover, and converting protocols according to mobile communication systems.

In the mobile communication terminal according to this embodiment, the asynchronous modem unit 123 of the asynchronous module 120 and the synchronous modem unit 133 of the synchronous module 130 can be controlled by the common module 140. Further, either of the asynchronous and synchronous modem units 123 and 133 can control the entire mobile communication terminal.

Figure 3:
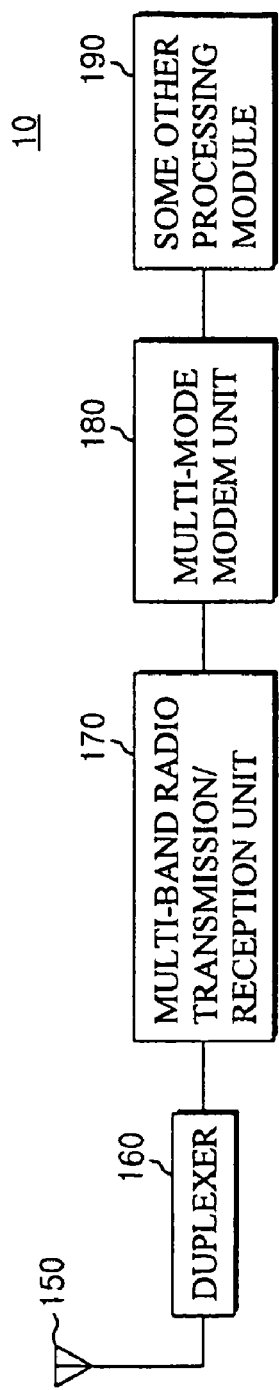

FIG. 3 is a view of another example of a mobile communication terminal applied to the present invention, which shows the case in which functional units for radio communication with asynchronous and synchronous networks are integrated.

As shown in FIG. 3, the DBDM mobile communication terminal 10 applied to the present invention includes an antenna 150, a duplexer 160, a multi-band radio transmission/reception unit 170, a multi-mode modem unit 180 and some other processing module 190.

The antenna 150 is capable of simultaneously processing frequency bands for synchronous and asynchronous mobile communication services.

The duplexer 160 functions as a band pass filter for separately processing frequencies from the asynchronous network and frequencies from the synchronous network. The multi-band radio transmission/reception unit 170 separates transmission/reception radio waves into preset frequency bands. The multi-mode modem unit 180 processes wireless section protocol with the asynchronous mobile communication system or the synchronous mobile communication system.

The processing module 190 includes an application processor that functions as a central processing unit for controlling the multi-mode modem unit 180 and performs a multimedia function, memory, an input/output unit, other application processing units, etc.

Further, in the DBDM mobile communication terminal 10, software used for user interfaces, additional services, mobility management, connection/session control, resource control, and protocol processing is installed, thus allowing a user to use various application services, performing handover, and converting protocols according to mobile communication systems.

As described above, if the radio transmission/reception units and the modem units are integrated, several advantages can be realized, such as the reduction of the size of the mobile communication terminal 10, the reduction of power consumption and the sharing of modem memory.

Figure 4A:
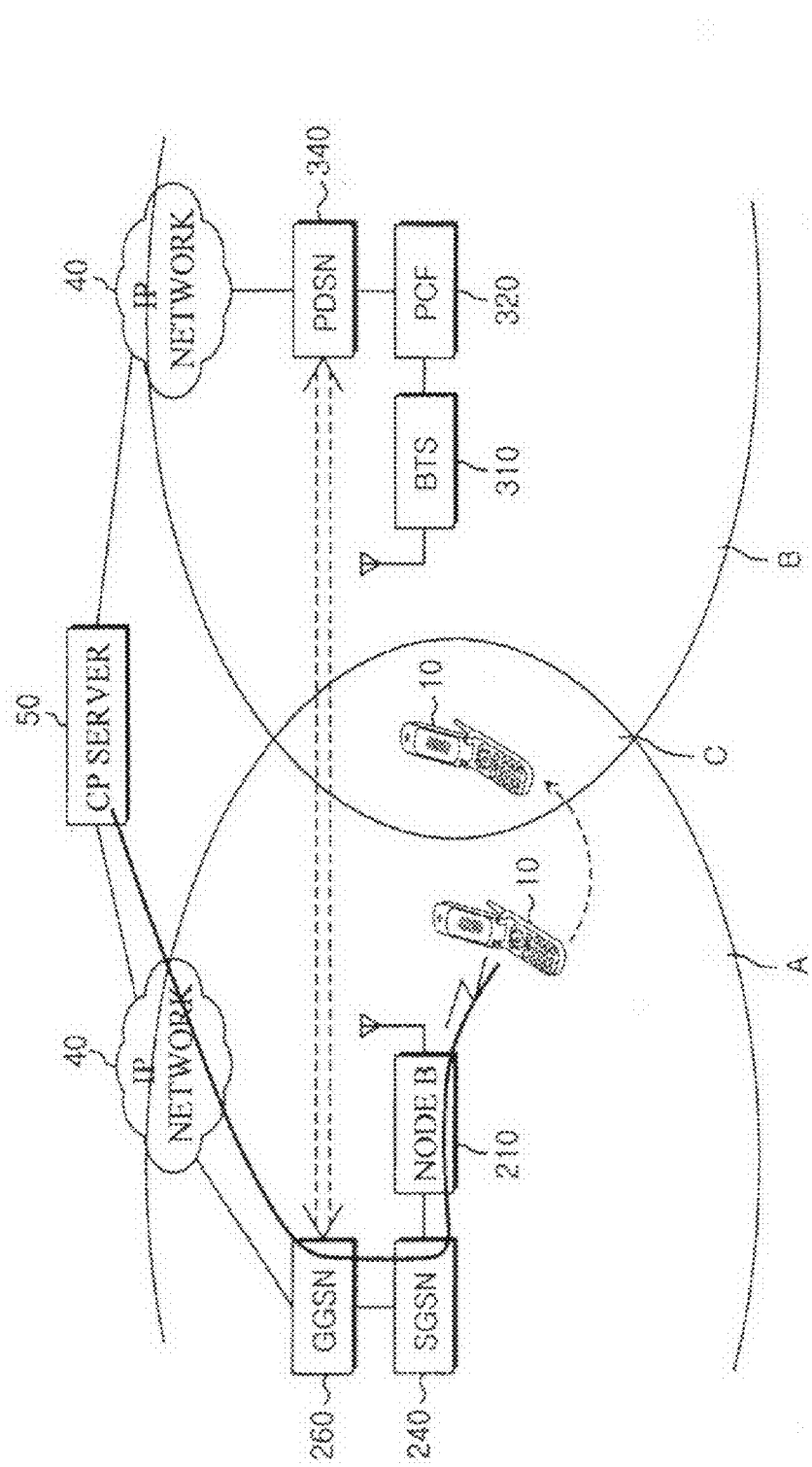
FIGS. 4A and 4B are conceptual views of handover for packet data service in a mobile communication network in which asynchronous and synchronous networks coexist.
Figure 4B:
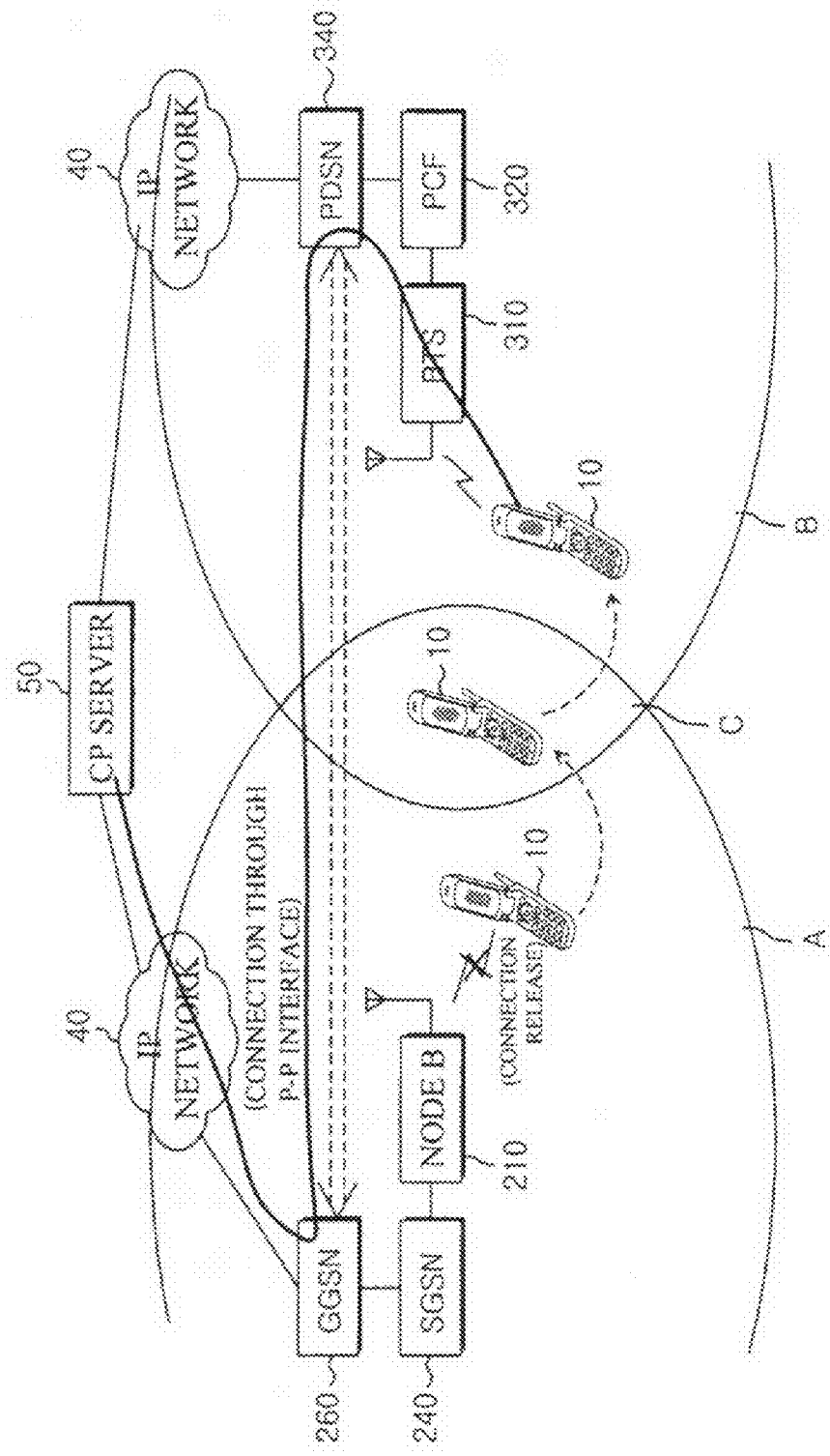

FIGS. 4A and 4B are conceptual views of handover for a packet data service in a mobile communication network in which asynchronous and synchronous networks coexist.

In a single mobile communication system, "handover" (or "handoff") means technology allowing a user to communicate without interruption when a mobile communication terminal moves from one cell of a mobile communication system to another cell thereof. The present invention relates to a handover method for a DBDM mobile communication terminal in a network in which synchronous and asynchronous mobile communication systems coexist. Of the cases in which the mobile communication terminal 10 moves from a synchronous area B into an asynchronous area A, and in which the mobile communication terminal 10 moves from an asynchronous area A into a synchronous area B, the latter is described in detail.

Referring to FIG. 4A, as the mobile communication terminal 10 that is connected to the IP network 40 through de node B 210, the SGSN 240 and the GGSN 260 and using a packet data service provided by the CP server 50 in the asynchronous area A approaches the synchronous area B through an overlap area C between the asynchronous and synchronous areas A and B, transmission/reception power between the node B 210 of the asynchronous mobile communication system and the mobile communication terminal 10 gradually attenuates. The asynchronous mobile communication system that senses the power attenuation requests the synchronous mobile communication system to perform handover. The synchronous mobile communication system, having received the request, assigns a channel to the mobile communication terminal 10 so as to provide the packet data service.

After channel assignment between the synchronous mobile communication system and the mobile communication terminal 10 has been completed, the asynchronous mobile communication system directs the mobile communication terminal to perform handover, thus performing handover to the synchronous mobile communication system. When the mobile communication terminal is completely connected to the synchronous mobile communication system, the synchronous mobile communication system notifies the asynchronous mobile communication system that handover has been completed. Accordingly, the node B 210 of the asynchronous mobile communication system releases the connection to the mobile communication terminal 10.

In the present invention, since the GGSN 260 of the asynchronous network and the PDSN 340 of the synchronous network can transmit and receive control signals and traffic through a P-P interface, die mobile communication terminal 10 can continuously use the packet data service using the GGSN 260 of the asynchronous network if the mobile communication terminal 10 releases the connection to the node B 210 and connects to the BTS 310 of the synchronous network.

Consequently, referring to FIG. 4B, die mobile communication terminal, handed over to the synchronous mobile communication system area B, is connected to the GGSN 260 of the asynchronous mobile communication system that is connected to the PDSN 340 through a P-P interface, via the BTS 310, the PCF 320 and the PDSN 340, and can continuously use the packet data service provided by the CP server 50 through the IP network 40.

This process is described in detail with reference to FIG. 5.

Figure 5:
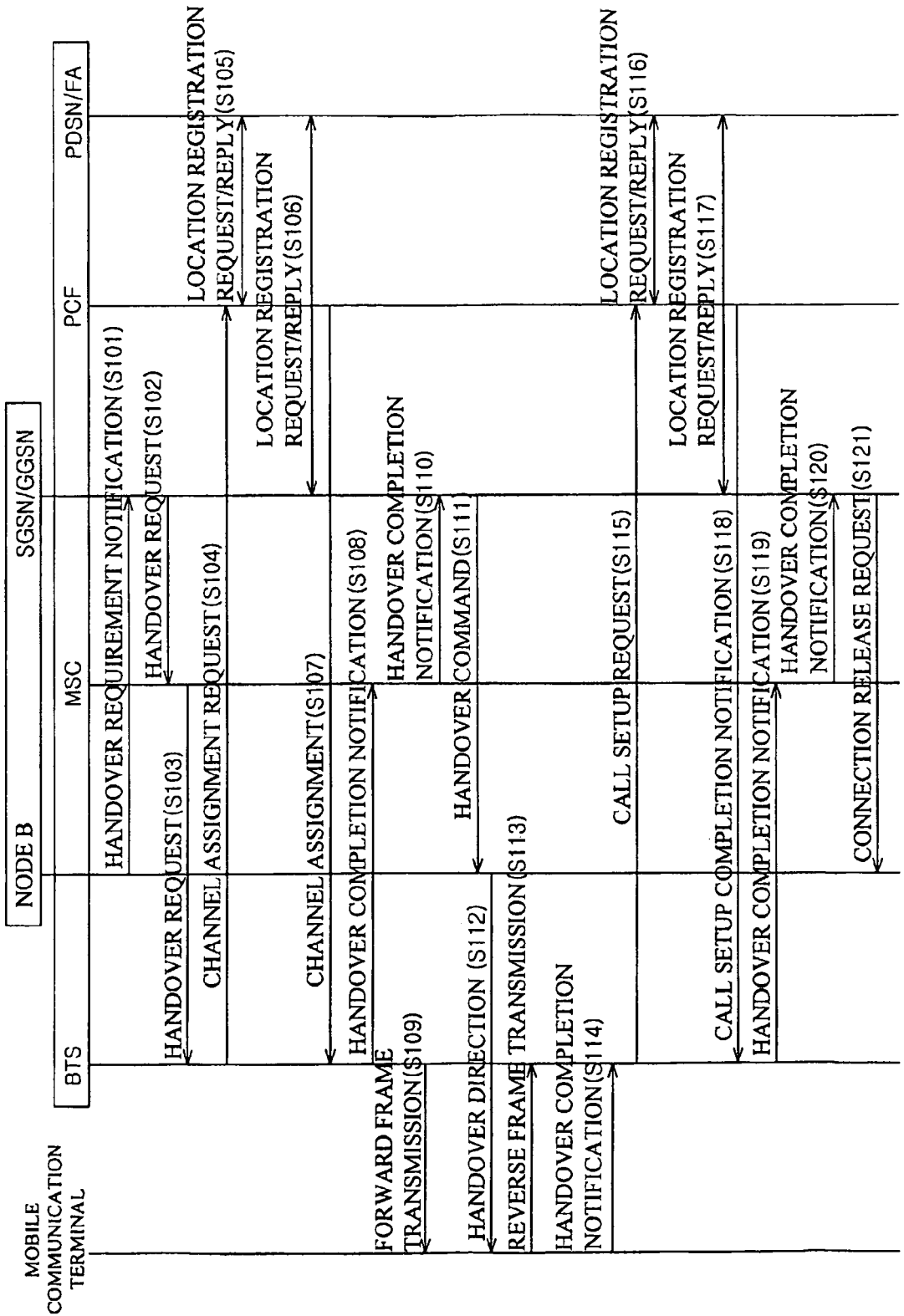
FIG. 5 is a flowchart of a handover method according to an embodiment of the present invention.

FIG. 5 is a flowchart of a handover method according to an embodiment of the present invention, which shows a handover method for a mobile communication terminal during the use of a packet data service when the GGSN 260 of the asynchronous network is connected to the PDSN 340 of the synchronous network through a P-P interface.

As the mobile communication terminal 10 using a packet data service in an asynchronous network moves into a synchronous network, the node B 210 of the asynchronous network determines that handover is required due to the power attenuation of transmission/reception to/from die mobile communication terminal 10, and notifies the SGSN/GGSN 240/260 of the requirement for handover (Serving Radio Network Subsystem: SRNS relocation required) at step S101. In this case, the identification number of the mobile communication terminal 10 is also transmitted, and the SGSN and GGSN 240 and 260 request the MSC 330 of die synchronous network to perform handover (FACDIR2) at step S102.

Accordingly, the MSC 330 requests the Base Transceiver Station (BTS) 310 to perform handover (Handoff request), and the BTS 310 performs a procedure of setting control signals and traffic to transmit packet data in the synchronous network. For this operation, the BTS 310 requests the packet controller (PCF) 320 to assign a channel (A9-setup) at step S104. Accordingly, the packet controller (PCF) 320 requests location registration from the Packet Data Service Node/Foreign Agent (PDSN/FA) 340, and receives location registration results (A11-Reg.Req/reply) at step S105. The PDSN/FA 340 requests location registration from die SGSN/GGSN 240/260 through the P-P interface and receives a reply to the location registration request (P-P Registration req/reply) at step S106, and then transmits channel assignment information to the BTS 310 (A9-connect) at step S107.

As described above, when channel assignment is completed, the BTS 310 notifies the MSC 330 that handover has been completed (Handoff Req. Ack) at step S108, and assigns a forward channel to the mobile communication terminal by transmitting a null frame to the mobile communication terminal through a forward fundamental channel (F-FCH) used for forward traffic transmission (FETCH frames) at step S109.

Further, the MSC 330, notified of the completion of the handover, notifies the SGSN/GGSN 240/260 that handover has been completed (facdir2) at step S110, and the SGSN/GGSN 240/260, having received the notification, commands the node B 210 to perform handover (SRNS Relocation Command) at step S111.

Thereafter, the node B 210 directs the mobile communication terminal to perform handover (HANDOVER FROM UTRAN CMD) at step S112. This direction message includes a message related to the synchronous mobile communication system, in particular, information about channel assignment. The mobile communication terminal, having received the handover direction message, directs the synchronous module to prepare to communicate with the synchronous mobile communication, switches to a synchronous mode, and transmits frames (R-FCH frames) to the BTS 310 of the synchronous mobile communication system through a reverse fundamental channel (R-FCH) at step S113. Thereafter, the mobile communication terminal notifies the BTS 310 that handover has been completed (HCM) at step S114. Accordingly, the connection between the mobile communication terminal 10 and the synchronous mobile communication system 30 is achieved.

Next, the BTS 310 performs a procedure for setting up a call with a packet network of the synchronous mobile communication system. If the BTS 310 requests the packet controller (PCF) 320 to set up a call (A9-connected) at step S115, the packet controller (PCF) 320 requests location registration from the PDSN/FA 340, and receives location registration results (A11-Reg. Req/reply) at step S116. Further, the PDSN/FA 340 requests location registration from the SGSN/GGSN 240/260 through a P-P interface, and receives a reply to the location registration request (P-P Registration req/reply) at step S117.

Thereafter, the packet controller (PCF) 320 notifies the BIS 310 that call setup has been completed (A-9 connected Ack) at step S118, and the BS 310 notifies the MSC 330 that handover has been completed (handoff Complete) at step S119. The MSC 330 notifies the SGSN/GGSN 240/260 that handover has been completed (Handoff Complete, MSONCH) at step S120. Then, the SGSN/GGSN 240/260 requests the node B 210 to release the connection to the mobile communication terminal (Iu Release Cmd) at step S121.

Accordingly, if service provided by the asynchronous mobile communication system 20 to the mobile communication terminal is released, die mobile communication terminal is connected to the GGSN through the BTS, the packet controller (PCF) and the packet data service node (PDSN), thus continuously using the packet data service provided by the CP server through the IP network.

Figure 6A:
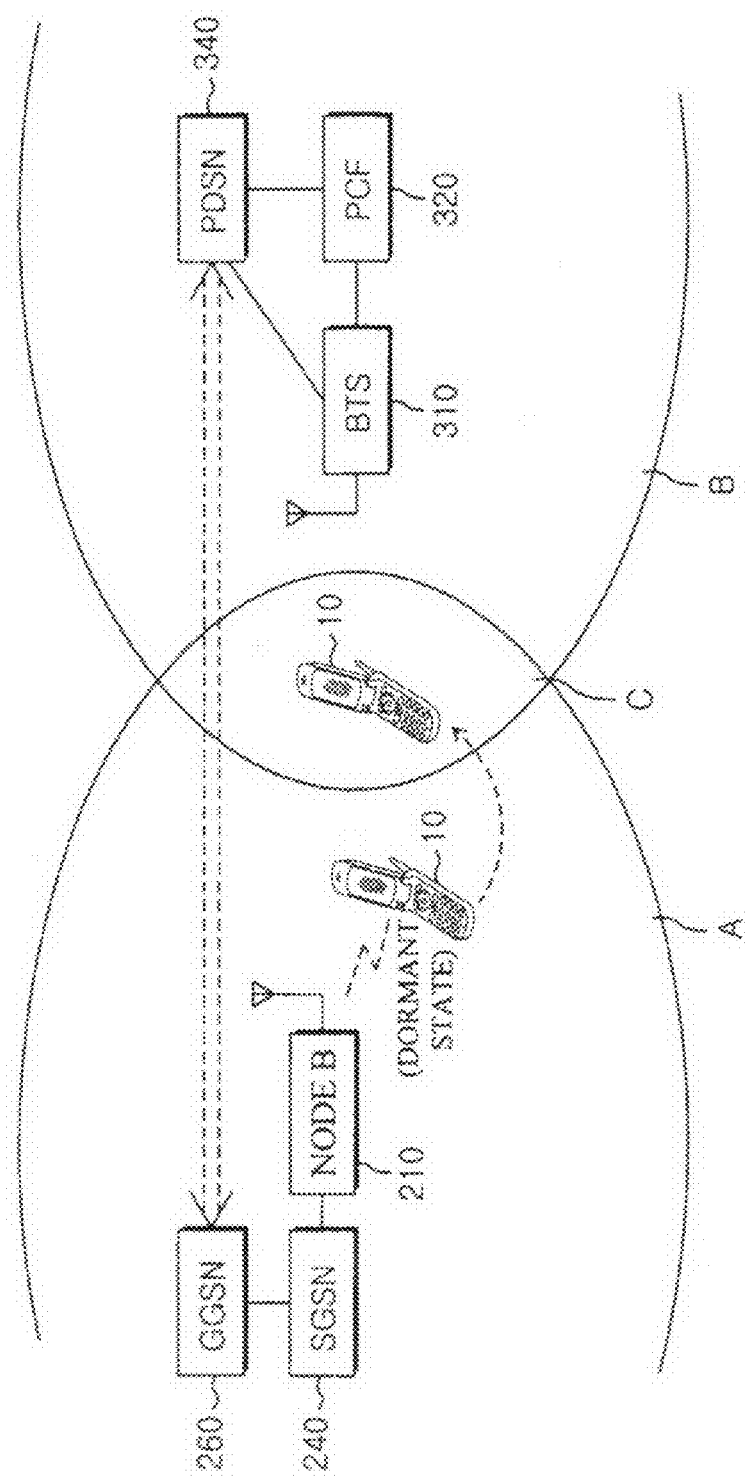
FIGS. 6A and 6B are conceptual views of handover of a mobile communication terminal in a dormant state in a mobile communication network in which asynchronous and synchronous networks coexist.
Figure 6B:
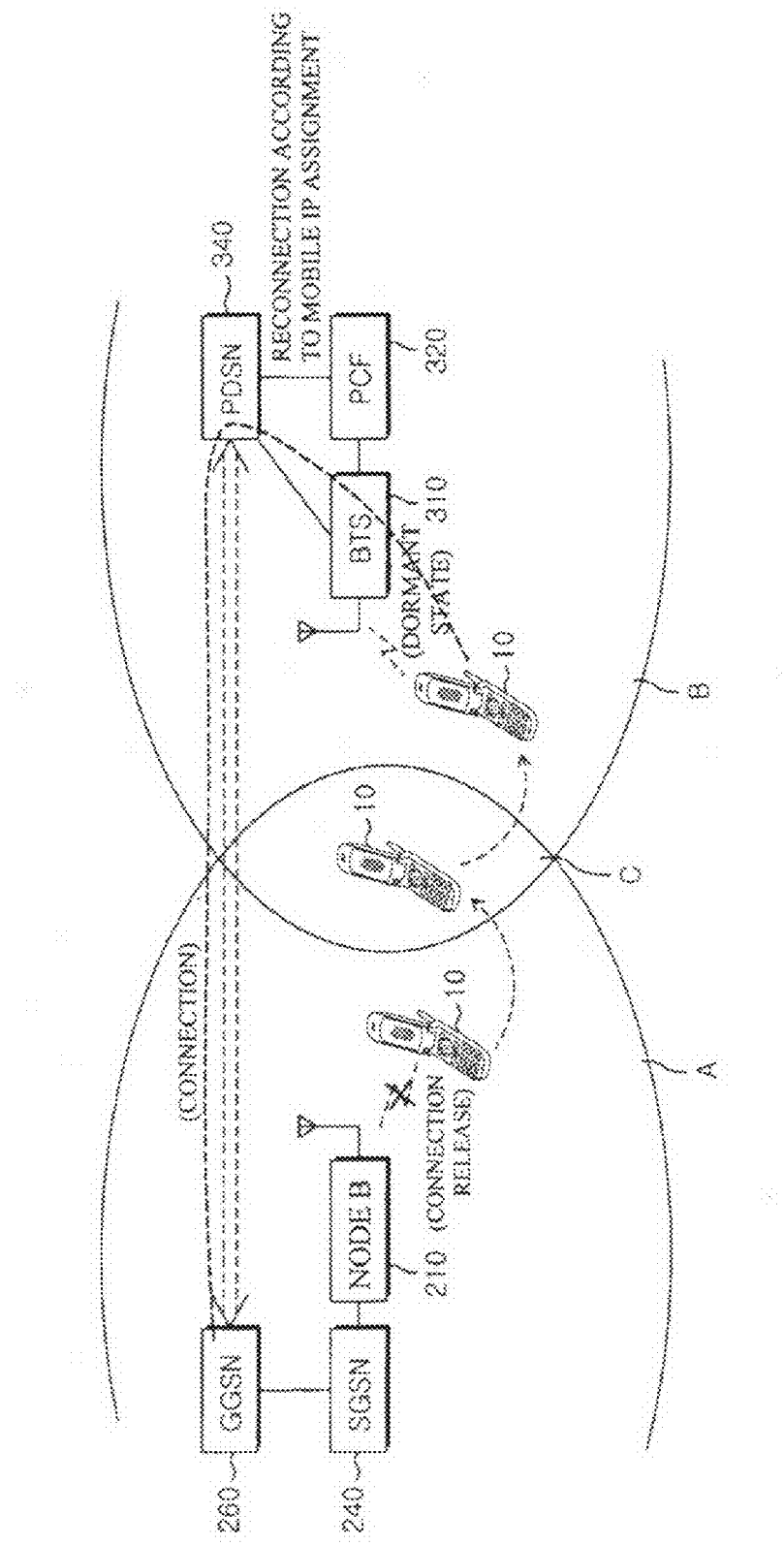

FIGS. 6A and 6B are conceptual views of handover of a mobile communication terminal in a dormant state in a mobile communication network in which asynchronous and synchronous networks coexist in this case, the case in which a mobile communication terminal 10 moves from an asynchronous area A into a synchronous area B is described as an example.

Referring to FIG. 6A, in the asynchronous area A, the mobile communication terminal establishes a session with the node B 210, is assigned a mobile IP and is in a dormant state in which, if a data signal is generated, the mobile communication terminal is connected to the IP network 40 through the SGSN 240 and the GGSN 260 to be able to use a packet data service provided by the CP server 50. As the mobile communication terminal 10 approaches the synchronous area B through an overlap area C between the asynchronous and synchronous areas A and B, the transmission/reception power between the node B 210 of the asynchronous mobile communication system and the mobile communication terminal 10 gradually attenuates. The asynchronous mobile communication system, having sensed the power attenuation, or the synchronous mobile communication system, having sensed the approach of die mobile communication terminal, notifies the SGSN/GGSN 240/260 of the asynchronous mobile communication system that handover is required. Accordingly, the SGSN/GGSN 240/260 commands the BTS 310 of the synchronous mobile communication system to perform handover, thus performing call setup and trunk setup between the mobile communication terminal and the synchronous mobile communication system.

In the present invention, since the GGSN 260 of the asynchronous network and the PDSN 340 of the synchronous network can transmit/receive control signals and traffic therebetween though a P-P interface, die mobile communication terminal 10 can continue to use the mobile IP assigned by the GGSN 260 of the asynchronous network even through die mobile communication terminal 10 releases the connection to the node B 210 and connects to the BTS 310 of the synchronous network, so that there is no need to assign anew mobile IP in the synchronous network.

Consequently, referring to FIG. 6B, the mobile communication terminal, handed over to the synchronous mobile communication system area B, remains in a dormant state with respect to the GGSN 260 of the asynchronous mobile communication system that is connected to the PDSN 340 through a P-P interface, via the BTS 310, the PCF 320 and the PDSN 340:

As described above, the mobile communication terminal, handed over to the synchronous mobile communication system area B, remains in a dormant state with respect to the asynchronous mobile communication system through the synchronous mobile communication system. Thereafter, if a data signal is generated, the mobile communication terminal makes a transition to an active state to immediately use a packet data service.

This process is described in detail with reference to FIG. 7.

Figure 7:
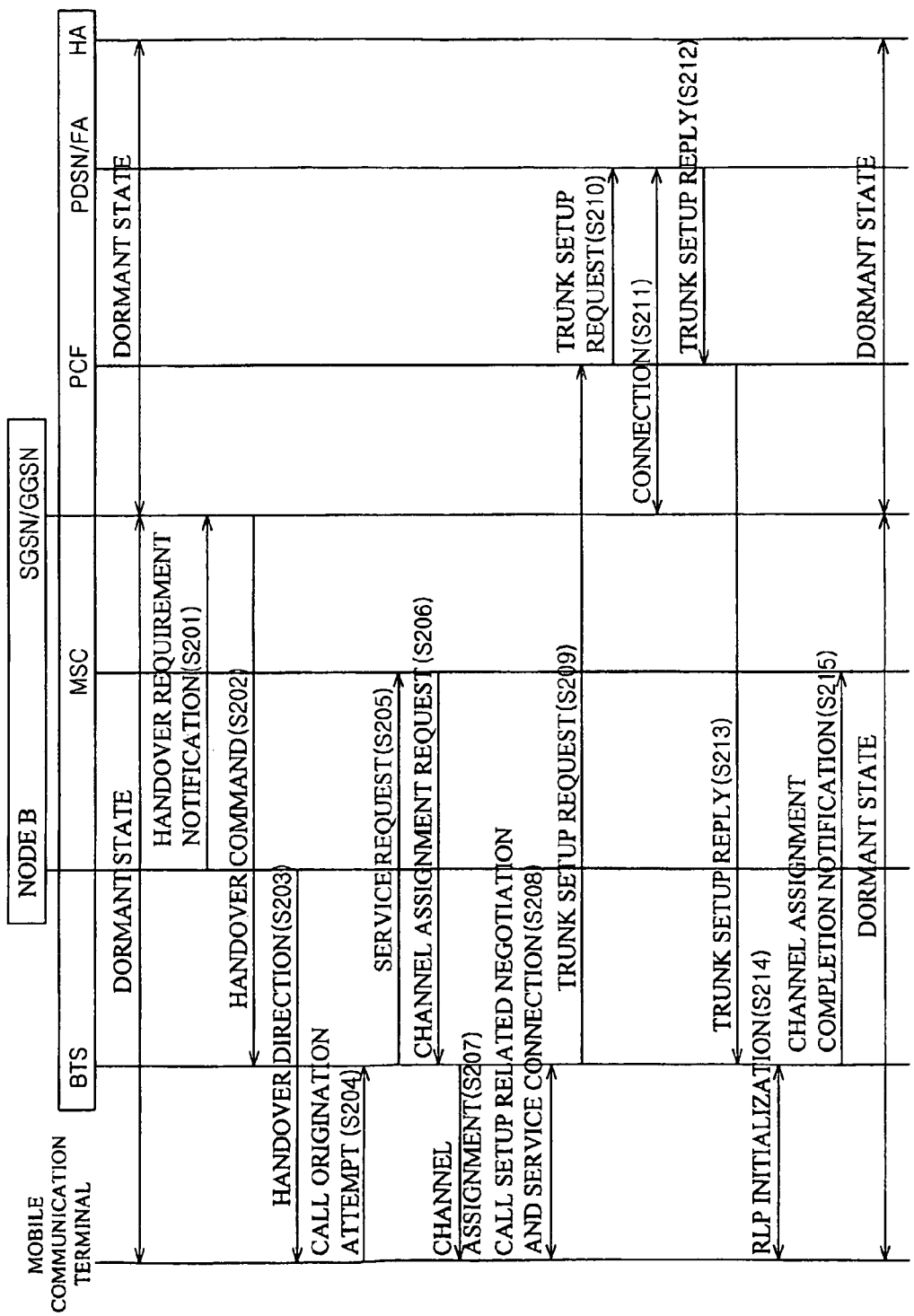
FIG. 7 is a flowchart of a handover method according to another embodiment of the present invention.

FIG. 7 is a flowchart of a handover method according to another embodiment of the present invention.

As the mobile communication terminal 10 in a dormant state in the asynchronous network area moves into the synchronous network area, the node B 210 of the asynchronous network recognizes the attenuation of transmission/reception power to/from the mobile communication terminal 10, determines that handover is required, and notifies the SGSN/GGSN 240/260 of the requirement for handover, thus indicating that the mobile communication terminal is leaving the asynchronous network area (SRNS Relocation Required) at step S201. At this time, the identification number of the mobile communication terminal 10 is also transmitted. Further, the step S101 of notifying die SGSN/GGSN 240/260 of the requirement for handover can be performed by the BTS 310 of the synchronous mobile communication system that has sensed the approach of the mobile communication terminal.

The SGSN/GGSN 240/260, notified of the requirement for handover, commands the BTS 310 of the synchronous network to perform handover (SRNS Relocation Command) at step S202. Further, the node B 210 directs the mobile communication terminal to perform handover (HANDOVER FROM UTRAN CMD) at step S203. This direction message includes a message related to the synchronous mobile communication system, in particular, information about channel assignment, traffic channel entry, etc.

Thereafter, the mobile communication terminal attempts to originate a call to the BTS 310 using an Origination Message (ORM) (ORM [DRS=1, APN name]) at step S204. Accordingly, call processing aid channel assignment are executed between the BTS 310 and the MSC 330. In detail, the BTS 310 transmits a service request message to the MSC 330 in response to the call origination attempt by the mobile communication terminal (Connection Management: CM Serv. Req.) at step S205. The MSC 330 requests the BTS 310 to assign a channel (Assign. Req.) at step S206, and the BTS 310, having received the channel assignment request, transmits a channel assignment message to the mobile communication terminal (ECAM: Extended Channel Assignment Message) at step S207.

Next, a negotiation related to call processing and setup is performed between the mobile communication terminal (synchronous module) and the BTS 310 of the synchronous mobile communication system (negotiate and connect service) at step S208, and a trunk setup procedure is performed. The trunk setup procedure can be performed through an A-interface. In detail, if the BTS 310 requests the packet controller (PCF) 320 to set up a trunk (A9 Setup-A8) at step S209, the packet controller 320 requests the PDSN 340 to set up a trunk (A11 RRQ) at step S210, and a connection is performed between the SGSN/GGSN 240/260 of the asynchronous network and the PDSN of the synchronous network (P-P setup) at step S211. The PDSN 340 transmits a reply signal to the trunk setup to the packet controller 320 (A11 RRP) at step S212. Thereafter, the packet controller 320 transmits the reply signal received from the PDSN 340 to the BTS 310 (A9 Connect-A8) at step S213.

As described above, when the trunk setup is completed, the initialization of a Radio Link Protocol (RLP) is performed between the mobile communication terminal and the BTS 310 (RLP initialization) at step S214. The BTS 310 notifies the MSC 330 that channel assignment has been completed (Assignment Complete) at step S215, thus enabling the mobile communication terminal to remain in a dormant state with respect to the GGSN 260 of the asynchronous mobile communication system through the PDSN 340 of the synchronous mobile communication system.

In the present invention, the PDSN 340 of the synchronous mobile communication system is connected to the GGSN 260 of the asynchronous mobile communication system through a P-P interface. Therefore, if the mobile communication terminal in a dormant state in the asynchronous mobile communication system area moves into the synchronous mobile communication system area, the mobile communication terminal can remain in its dormant state using the mobile IP assigned by the asynchronous mobile communication system without being assigned a new mobile IP.

Figure 8:
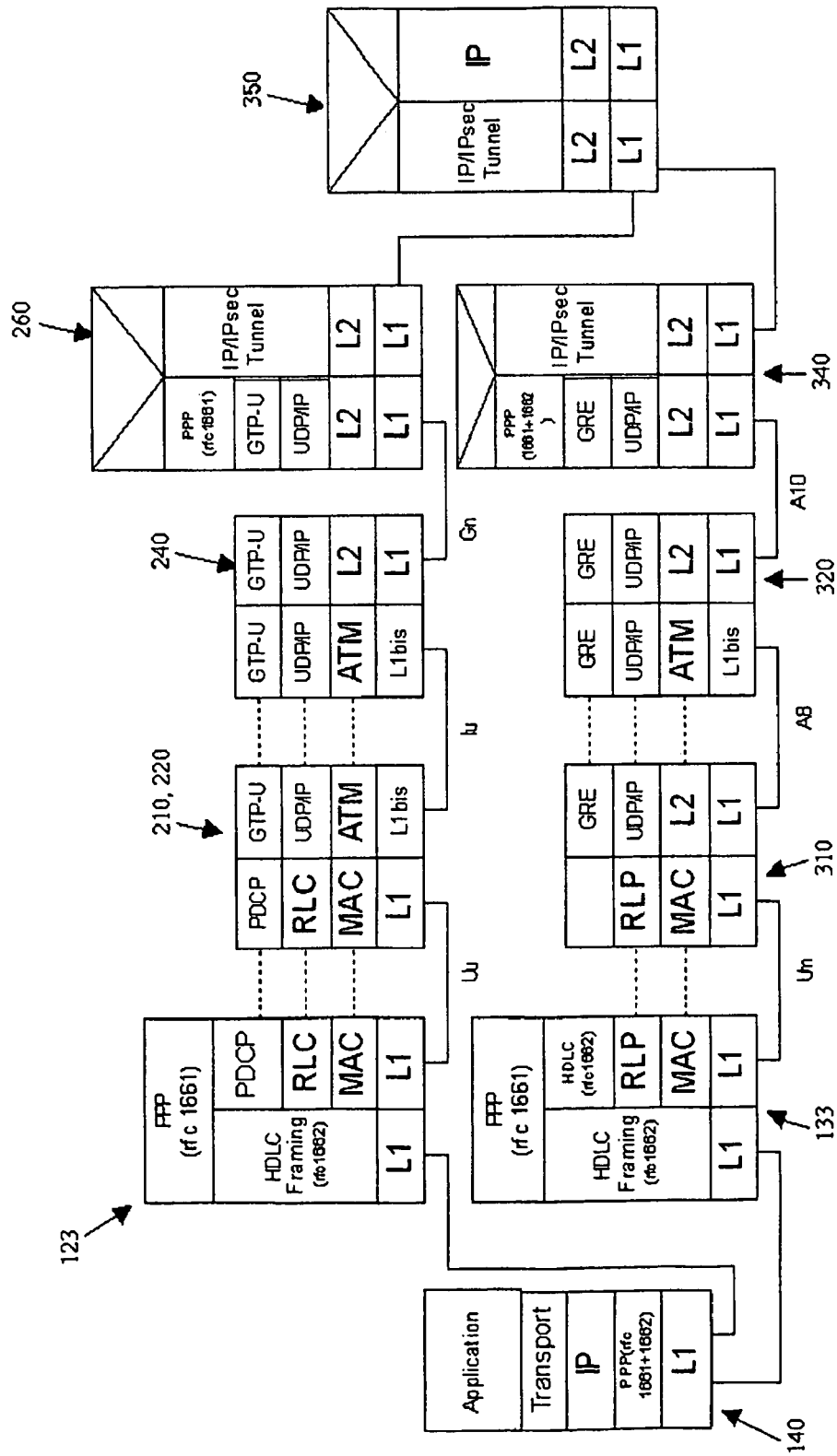
FIG. 8 is a view showing an example of a protocol stack applied to the mobile communication system according to the present invention.

FIG. 8 is a view of an example of a protocol stack applied to a mobile communication system according to the present invention, which shows a user plane protocol stack applicable to the case in which a common module 140 is constructed to control a DBDM mobile communication terminal in the DBDM mobile communication terminal of FIG. 2.

In the present invention, the GGSN 260 of the asynchronous network is connected to the PDSN 340 of the synchronous network through a P-P interface, so that the GGSN 260 has a protocol for communication with the IP network 40, a protocol for communication with the SGSN 240 of the asynchronous network and a protocol for communication with the PDSN 340 of the synchronous network. All of the three types of protocols include an L1 layer (physical layer) for performing coding and modulation, and an L2 layer for processing replies for the correct transmission of messages.

In detail, the GGSN 260 includes an IP layer and a layer for the tunneling of the L2 layer in addition to the L1 and L2 layers so as to communicate with the IP network 40. Further, the GGSN 260 includes a User Datagram Protocol (UDP)/Internet Protocol (IP) layer for exchanging messages in a system that transits data using IP, and a GPRS Tunneling Protocol (GTP)-U layer for defining the flow of packet data and information, in addition to L1 and L2 layers, so as to communicate with the SGSN 240 through a Gn interface. Further, the GGSN 260 includes a UDP/IP layer, a Generic Routing Encapsulation (GRE) layer for encrypting and compressing packets, and a High-level Data Link Control (HDLC) framing layer for performing link management for link connection and disconnection, synchronization problem solution, flow control, error control, etc., in addition to L1 and L2 layers, so as to communicate with the PDSN 340 through a P-P interface. Both the protocol stack for communication with the SGSN 240 and the protocol stack with the PDSN 340 further include a Point-to-Point Protocol (PPP) layer, thus performing packet compression, authentication, IP assignment, etc. in order to perform data communication.

Next, the SGSN 240 is connected to the GGSN 260 through a Gn interface, includes an L1bis layer corresponding to the L1 layer and an Asynchronous Transfer Mode (ATM) layer for performing the generation, extraction and exchange of packet data to correspond to the L2 layer, so as to convert protocols used in the GGSN 260, and does not convert protocols with respect to data used in other higher UDP/IP and GTP-U layers.

Further, the node B and the RNC 210 and 220 are connected to the SGSN 240 through an Iu interface, and include an L1 layer corresponding to the L1bis layer, a Media Access Control (MAC) layer for assigning radio resources, etc. for multimedia data processing to correspond to the ATM layer, a Radio Link Control (RLC) layer for establishing a radio link with the mobile communication terminal and combining and dividing packet data to correspond to the UDP/IP layer, and a Packet Data Convergence Protocol (PDCP) for compressing a packet data header, etc. to correspond to the GTP-U layer, so as to convert protocols used in the SGSN 240.

Furthermore, the asynchronous modem unit 123 of the mobile communication terminal does not perform protocol conversion with respect to an L1 layer and includes an HDLC firming layer for performing link management for link connection and disconnection, synchronization problem solution, flow control, error control, etc. to correspond to the MAC/RLC/PDCP layers, so as to convert protocols used in the node B/RNC, and includes a PPP layer for receiving data through the PPP layer of the GGSN 260.

In the meantime, the PDSN 340 is connected to the GGSN 260 through a P-P interface, includes an L1bis layer corresponding to the L1 layer and an Asynchronous Transfer Mode (ATM) layer for performing the generation, extraction and exchange of packet data to correspond to the L2 layer so as to convert protocols used in the GGSN 260, and does not perform protocol conversion with respect to data used in other higher UDP/AP and GTP-U layers.

Further, the BTS and PCF 310 and 320 are connected to the PDSN 340 through an A-interface (A10), and include an L1 layer corresponding to the L1bis layer, a Media Access Control (MAC) layer for assigning radio resources for multimedia data processing to correspond to the ATM layer, and an RLP layer, for requesting retransmission of erroneous frames to prevent the occurrence of errors in a wireless section, to correspond to the UDP/IP layer, so as to convert protocols used in the PDSN 340.

Furthermore, the synchronous modem unit 133 of the mobile communication terminal does not perform protocol conversion with respect to an L1 layer and includes an HDLC framing layer for performing link management for link connection and disconnection, synchronization problem solution, flow control and error control to correspond to the MAC/RLP layers, so as to convert protocols used in the BTS/PCF, and includes a PPP layer for receiving data through the PPP layer of the GGSN 260.

Finally, the common module 140 of the mobile communication terminal includes an L1 layer, a PPP layer, an IP layer, a transport layer and an application layer so as to convert protocols of data received from the asynchronous modem unit 123 and the synchronous modem unit 133.

In this embodiment, it can be seen that both the asynchronous modem unit 123 and the synchronous modem unit 133 perform only a communication function, and the common module establishes protocols of higher PPP and IP layers.

In the present invention, the GGSN of the asynchronous network is connected to the PDSN of the synchronous network through a P-P interface. Therefore, if the mobile communication terminal 10 moves into a synchronous area while connecting to the asynchronous mobile communication system 20 using the asynchronous module 120 and utilizing a packet data service, the mobile communication terminal 10 is assigned a channel for the packet data service by the synchronous network, and is then capable of continuously using the packet data service through the PDSN of the synchronous network and the GGSN of the asynchronous network, thus preventing service interruption from occurring at the time of handover of the mobile communication terminal.

Further, in the present invention, the GGSN of the asynchronous network is connected to the PDSN of the synchronous network through a P-P interface. Therefore, if the mobile communication terminal 10 moves into a synchronous area while the asynchronous module 120 of the mobile communication terminal 10 is in a dormant state with respect to the asynchronous mobile communication system, the mobile communication terminal 10 can remain in a dormant state to continuously use the packet data service.

As described above, those skilled in the art will appreciate that the present invention can be implemented with other embodiments without changing the technical spirit or essential features thereof. Therefore, the above-described embodiments should be appreciated as having been disclosed for illustrative purposes and are not restrictive. Those skilled in the art will appreciate that the scope of the present invention is defined by the accompanying claims rather than the above detailed description, and various modifications, additions and substitutions, derived from die meaning and scope of the claims and equivalent concepts thereof, belong to the scope of the present invention.

INDUSTRIAL APPLICABILITY

As described above, a mobile communication system for a packet data service and handover method therefor in a mobile communication network in which asynchronous and synchronous networks coexist according to the present invention can provide continuous service through an interface between a GGSN of the asynchronous network and a PDSN of the synchronous network when handover occurs during the use of a packet data service using a dual-band dual-mode mobile communication terminal in a mobile communication network in which asynchronous and synchronous mobile communication systems coexist, thus improving the quality of service.

Further, the present invention is advantageous in that it allows a mobile communication terminal to remain in a dormant state through the interface between the GGSN of the asynchronous mobile communication system and the PDSN of the synchronous mobile communication system without assigning a new mobile IP to the mobile communication terminal, in the case in which the mobile communication terminal in a dormant state in the asynchronous mobile communication system area moves into a synchronous mobile communication system area, thus allowing the mobile communication terminal to immediately react to the packet data service and consequently improving the quality of service.

The invention claimed is:

1. A handover method for providing a packet data service to a dual-band dual-mode mobile communication terminal in a mobile communication network in which asynchronous and synchronous mobile communication systems coexist, the dual-band dual-mode communication terminal being provided with an asynchronous modem unit and a synchronous modem unit, the asynchronous mobile communication system having a Gateway General packet radio service (GPRS) Support Node (GGSN) being connected to a packet data service node of the synchronous mobile communication system, the handover method comprising:

the first step of, as the mobile communication terminal that is connected to the asynchronous mobile communication system and uses the packet data service moves into an area of the synchronous mobile communication system, and a handover event occurs, a node B of the asynchronous mobile communication system notifying a Serving GPRS Support Node (SGSN)/GGSN of the asynchronous mobile communication system that handover is required;

the second step of the SGSN/GGSN requesting a mobile switching center of the synchronous mobile communication system to perform handover, and the synchronous mobile switching center requesting a base station of the synchronous mobile communication system to perform handover;

the third step of the synchronous mobile communication system performing a procedure of setting control signals and traffic for transmission of packet data;

the fourth step of the base station notifying the mobile switching center that handover has been completed and assigning a forward channel to the mobile communication terminal;

the fifth step of the mobile switching center notifying the SGSN/GGSN that handover has been completed;

the sixth step of, as the SGSN/GGSN commands the node B to perform handover, the node B directing the mobile communication terminal to perform handover;

the seventh step of performing assignment of a reverse channel between the mobile communication terminal and the synchronous mobile communication system, and the mobile communication terminal interfacing with the synchronous mobile communication system and notifying the base station that handover has been completed;

the eighth step of the synchronous mobile communication system performing call setup for the packet data service;

the ninth step of the base station notifying the synchronous mobile switching center that handover has been completed, and the mobile switching center notifying the SGSN/GGSN that handover has been completed; and the tenth step of the SGSN/GGSN requesting the node B to release a connection to the mobile communication terminal.

2. The handover method according to claim 1, wherein the SGSN/GGSN receives an identification number of the mobile communication terminal at the first step.

3. The handover method according to claim 1, wherein the third step comprises the steps of:

the base station requesting a packet controller of the synchronous mobile communication system to assign a channel;

the packet controller requesting location registration from the packet data service node of the synchronous mobile communication system and receiving results of the location registration request; the packet data service node requesting location registration form the SGSN/GGSN and receiving a reply to the location registration request; and the packet controller transmitting channel assignment information to the base station.

4. The handover method according to claim 1, wherein a message, including the handover direction transmitted from the node B to the mobile communication terminal at the sixth step, includes information used for channel assignment between the mobile communication terminal and the synchronous mobile communication system.

5. The handover method according to claim 1, wherein the eighth step comprises the steps of:

the base station requesting the packet controller of the synchronous mobile communication system to set up a call;

the packet controller requesting location registration from the packet data service node of the synchronous mobile communication system and receiving results of the location registration request;

the packet data service node requesting location registration from the SGSN/GGSN and receiving a reply to the location registration request; and the packet controller notifying the base station that call setup has been completed.

6. The handover method according to claim 1, wherein the GGSN of the asynchronous mobile communication system is connected to the packet data service node of the synchronous mobile communication system through a Packet data-Packet data (P-P) interface.

7. A handover method for providing a packet data service to a dual-band dual-mode mobile communication terminal in a mobile communication network in which asynchronous, and synchronous mobile communication systems coexist, the dual-band dual-mode communication terminal being provided with an asynchronous modem unit and a synchronous modem unit, the asynchronous mobile communication system having a Gateway General packet radio service (GPRS) Support Node (GGSN) being connected to a packet data service node of the synchronous mobile communication system, the handover method comprising:

the first step of, as the mobile communication terminal, in a dormant state with respect to the asynchronous mobile communication system, moves into an area of the synchronous mobile communication system, a Serving GPRS Support Node (SGSN)/GGSN of the asynchronous mobile communication system receiving information indicating that handover is required;

the second step of the SGSN/GGSN commanding a base station of the synchronous mobile communication system to perform handover;

the third step of the mobile communication terminal attempting to originate a call to the base station, and executing call processing and channel assignment between the base station and the mobile switching center of the synchronous mobile communication system;

the fourth step of performing a negotiation related to call processing and setup between the mobile communication terminal and the base station;

the fifth step of the synchronous mobile communication terminal setting up a trunk;

the sixth step of initializing a radio link protocol between the mobile communication terminal and the base station; and the seventh step of the base station notifying the mobile switching center that the channel assignment has been completed.

8. The handover method according to claim 7, wherein the SGSN/GGSN is notified by a node B of the asynchronous mobile communication system or the base station of the synchronous mobile communication system that handover is required at the first step.

9. The handover method according to claim 7, wherein the SGSN/GGSN receives an identification number of the mobile communication terminal at the first step.

10. The handover method according to claim 7, wherein a message, including the handover command transmitted from the SGSN/GGSN to the mobile communication terminal at the second step, includes channel assignment information and traffic channel entry information.

11. The handover method according to claim 7, wherein the third step comprises the steps of:

the base station transmitting a service request message to the mobile switching center in response to the attempt by the mobile communication terminal to originate a call;

the mobile switching center requesting the base station to assign a channel; and the base station transmitting a channel assignment message to the mobile communication terminal.

12. The handover method according to claim 7, wherein the fifth step comprises the steps of:

the base station requesting the packet controller of the synchronous mobile communication system to set up a trunk;

the packet controller requesting the packet data service node to set up a trunk and receiving a reply to the trunk setup request; and the packet controller transmitting a reply signal received from the packet data service node to the base station.

13. The handover method according to claim 7, wherein the GGSN of the asynchronous mobile communication system is connected to the packet data service node of the synchronous mobile communication system through a Packet data-Packet data (P-P) interface.

14. A mobile communication system in which asynchronous and synchronous mobile communication systems coexist, the asynchronous mobile communication system including a node B functioning as a base station for wireless section communication with a dual-band dual-mode mobile communication terminal provided with an asynchronous modem unit and a synchronous modem unit, a radio network controller, a Serving General packet radio service (GPRS) Support Node (SGSN), and a Gateway GPRS Support Node (GGSN), the synchronous mobile communication system including a base station for supporting wireless section communication with the mobile communication terminal, a packet controller, and a packet data service node, the mobile communication system being capable of performing handover when the mobile communication terminal is using a packet data service, wherein:
the GGSN communicates with an IP network through an L1 layer for performing coding and modulation, an L2 layer for processing replies for message transmission, and a layer for tunneling the L2 layer, communicates with the SGSN through the L1 layer, the L2 layer, a User Datagram Protocol (UDP)/Internet Protocol (IP) layer for exchanging messages, and a GPRS Tunneling Protocol (GTP)-U layer for defining a flow of packet data and information, communicates with the packet data service node through the L1 layer, the L2 layer, the UDP/IP layer, a Generic Routing Encapsulation (GRE) layer for encrypting and compressing packets and a High-level Data Link Control (I-IDLC) framing layer for performing link management, synchronization problem solution, flow control and error control, and provides the packet data service through a Point-to-Point Protocol (PPP) layer,

- a protocol stack of the SGSN includes an L1bis layer corresponding to the L1 layer of the GGSN, an Asynchronous Transfer Mode (ATM) layer for performing generation, extraction and exchange of packet data to correspond to the L2 layer, a UDP/IP layer and a GTP-U layer,
- a protocol stack of the node B/radio network controller includes an LI layer corresponding to the L1bis layer of the SGSN, a Media Access Control (MAC) layer for assigning radio resources for multimedia data processing to correspond to the ATM layer, a Radio Link Control (RLC) layer for establishing a radio link with the mobile communication terminal and combining and dividing packet data to correspond to the UDP/IP layer, and a Packet Data Convergence Protocol (PDCP) layer for compressing a packet data header to correspond to the GTP-U layer, and
- the asynchronous modem unit of the mobile communication terminal performs data communication using a protocol stack that includes an HDLC framing layer for performing link management for link connection and disconnection, synchronization problem solution, flow control and error control to correspond to the MAC/RLC/PDCP layers of the node B/radio network controller, and a PPP layer for receiving data through the PPP layer of the GGSN.

15. The mobile communication system according to claim 14, wherein:

- the packet data service node connected to the GGSN includes an L1 bis layer corresponding to the L1 layer, an Asynchronous Transfer Mode (ATM) layer for performing generation, extraction and exchange of packet data to correspond to the L2 layer, a UDP/IP layer and a GTP-U layer,
- a protocol stack of the base station/packet controller includes an L1 layer corresponding to the L1bis layer of the packet data service node, a MAC layer for assigning radio resources for multimedia data processing to correspond to the ATM layer, and a Radio Link Protocol (RLP) layer for requesting retransmission of erroneous frames to prevent errors from occurring in a wireless section to correspond to the UDP/IP layer,
- the synchronous modem unit of the mobile communication terminal performs data communication using a protocol stack that includes an L1 layer, an HDLC flaming layer for performing link management for link connection and disconnection, synchronization problem solution, flow control and error control to correspond to the MAC/RLP layers, and a PPP layer for receiving data through the PPP layer of the GGSN, and
- the mobile communication terminal includes a common module that performs data communication through an L1 layer, a PPP layer, an IP layer, a transport layer and an application layer so as to convert protocols of data received from the asynchronous modem unit and the synchronous modem unit.

* * * * *